US008966166B2

(12) United States Patent
Nishioka et al.

(10) Patent No.: US 8,966,166 B2
(45) Date of Patent: Feb. 24, 2015

(54) INFORMATION PROCESSING APPARATUS AND INFORMATION PROCESSING METHOD

(75) Inventors: Yoshio Nishioka, Tokyo (JP); Akihiro Takamura, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/468,370

(22) Filed: May 10, 2012

(65) Prior Publication Data

US 2012/0317351 A1 Dec. 13, 2012

(30) Foreign Application Priority Data

Jun. 9, 2011 (JP) ................................. 2011-129540

(51) Int. Cl.
*G06F 12/00* (2006.01)
*G06F 13/16* (2006.01)

(52) U.S. Cl.
CPC ..................................... *G06F 13/16* (2013.01)
USPC ....................................................... 711/105

(58) Field of Classification Search
USPC ....................................................... 711/105
See application file for complete search history.

(56) References Cited

U.S. PATENT DOCUMENTS

| 5,809,539 | A * | 9/1998 | Sakakibara et al. ........... 711/151 |
| 6,253,297 | B1 * | 6/2001 | Chauvel et al. ............... 711/167 |
| 7,000,045 | B2 * | 2/2006 | Holm et al. .................... 710/110 |
| 7,159,066 | B2 * | 1/2007 | Dodd ................................. 711/5 |
| 7,543,105 | B2 | 6/2009 | Takizawa |
| 7,743,179 | B2 * | 6/2010 | Li et al. ............................ 710/33 |
| 2004/0064646 | A1 * | 4/2004 | Emerson et al. ............... 711/131 |
| 2005/0182868 | A1 * | 8/2005 | Kang .............................. 710/35 |
| 2005/0268024 | A1 * | 12/2005 | Seo et al. .......................... 711/5 |
| 2008/0034139 | A1 * | 2/2008 | Han et al. ....................... 710/110 |
| 2008/0183977 | A1 * | 7/2008 | Gower et al. .................. 711/154 |
| 2009/0204780 | A1 * | 8/2009 | Kondo et al. .................. 711/168 |

FOREIGN PATENT DOCUMENTS

| JP | 5-210569 A | 8/1993 |
| JP | 8-278919 A | 10/1996 |
| JP | 11-16339 A | 1/1999 |
| JP | 2004-295322 A | 10/2004 |

OTHER PUBLICATIONS

Japanese Office Action dated Nov. 21, 2014 corresponding to Japanese Patent Application No. 2011-129540.

* cited by examiner

*Primary Examiner* — Charles Rones
*Assistant Examiner* — Nanci Wong
(74) *Attorney, Agent, or Firm* — Fitzpatrick, Cella, Harper Scinto

(57) ABSTRACT

There is provided with an information processing apparatus comprising a DRAM, a memory controller configured to access the DRAM, and a bus master configured to send, to the memory controller, an access request to the DRAM, the bus master comprises a transmission unit configured to transmit, to the memory controller, using a signal indicating a type of burst access which is requested of the memory controller by the bus master, an instruction to designate that an auto-precharge operation is not to be performed after accessing the first address, and an instruction to designate that an auto-precharge operation is to be performed after accessing the first address.

11 Claims, 7 Drawing Sheets

FIG. 4

| HBURST[2:0] | HBURST[2:0] | DESCRIPTION |
|---|---|---|
| 000 | SINGLE | SINGLE TRANSFER |
| 001 | INCR | INCREMENTAL BURST OF UNSPECIFIED LENGTH |
| 010 | WRAP4 | 4-BEAT WRAPPED BURST |
| 011 | INCR4 | 4-BEAT INCREMENTAL BURST |
| 100 | WRAP8 | 8-BEAT WRAPPED BURST |
| 101 | INCR8 | 8-BEAT INCREMENTAL BURST |
| 110 | WRAP16 | 16-BEAT WRAPPED BURST |
| 111 | INCR16 | 16-BEAT INCREMENTAL BURST |

INFORMATION PROCESSING APPARATUS AND INFORMATION PROCESSING METHOD

BACKGROUND OF THE INVENTION

1. Field of the Invention

The present invention relates to an information processing apparatus and an information processing method and, more particularly, to a memory access method for an information processing apparatus.

2. Description of the Related Art

A DRAM is currently used as a main memory for various kinds of devices. A DRAM device is formed by a plurality of banks, each of which is formed by a plurality of pages. The DRAM has a high-speed access mode called a page mode, which allows access in a short time without precharge (a page close) during access (a page hit) to one page within a bank of the DRAM. To access another page within the same bank (a page miss), however, it is necessary to close, by precharge, the page for which a write or read operation has been executed, and to open the other page by designating a new ROW address, thereby accessing the other page.

To deal with this, there has been disclosed a technique of increasing the memory access speed by controlling a precharge operation (a page close) according to the memory access pattern of each processing apparatus. For example, according to a method described in Japanese Patent Laid-Open No. 2004-295322, a bus master notifies a memory controller of an address to be accessed next in addition to an address to which access is currently requested. According to this notification, the memory controller determines whether to perform a precharge operation (auto-precharge operation) after accessing the requested address. According to a method described in Japanese Patent Laid-Open No. 5-210569, a bus master compares a current address with a prefetch address. The bus master then uses a dedicated signal line for indicating a page hit/page miss to notify a memory controller of whether it is necessary to perform an auto-precharge operation.

According to the method described in Japanese Patent Laid-Open No. 2004-295322, however, the memory controller needs to buffer an address to be accessed later, thereby increasing its circuit scale. This may also increase the cost. On the other hand, according to the method described in Japanese Patent Laid-Open No. 5-210569, the bus master uses the dedicated signal line for indicating a page hit/page miss to notify the memory controller of whether to perform an auto-precharge operation, thereby increasing the number of wiring lines. Furthermore, to add such a signal line, it is necessary to change a bus interface. These points may also increase the cost.

SUMMARY OF THE INVENTION

The present invention provides a lower-cost method in which a bus master controls a precharge operation by a DRAM, thereby increasing the access speed to the DRAM.

According to one aspect of the invention, an information processing apparatus comprises a DRAM, a memory controller configured to access the DRAM, and a bus master configured to send, to the memory controller, an access request to the DRAM, wherein the bus master comprises an obtaining unit configured to obtain a first address on the DRAM to which access is requested, and to obtain a second address on the DRAM to which access is requested following the access to the first address, a determination unit configured to determine whether a precharge operation is necessary in the DRAM after accessing the first address and before accessing the second address, a first transmission unit configured to transmit the first address to the memory controller, and a second transmission unit configured to transmit, to the memory controller, using a signal indicating a type of burst access which is requested of the memory controller by the bus master, an instruction to designate that an auto-precharge operation is not to be performed after accessing the first address when the determination unit determines that the precharge operation is not necessary, and an instruction to designate that an auto-precharge operation is to be performed after accessing the first address when the determination unit determines that the precharge operation is necessary, and the memory controller comprises an access unit configured to make, when an auto-precharge operation is designated not to be performed after accessing the first address, access without auto-precharge to the first address of the DRAM, and to make, when an auto-precharge operation is designated to be performed after accessing the first address, access with auto-precharge to the first address.

According to another aspect of the invention, an information processing apparatus comprises a DRAM, a memory controller configured to access the DRAM, and a bus master configured to send, to the memory controller, an access request to the DRAM, wherein the bus master comprises an obtaining unit configured to obtain a first address on the DRAM to which access is requested, and to obtain a second address on the DRAM to which access is requested following the access to the first address, a determination unit configured to determine whether a precharge operation is necessary in the DRAM after accessing the first address and before accessing the second address, a first transmission unit configured to transmit the first address to the memory controller, and a second transmission unit configured to transmit, to the memory controller, using a signal indicating whether the bus master has requested exclusive access to a bus which connects the bus master with the memory controller, an instruction to designate that an auto-precharge operation is not to be performed after accessing the first address when the determination unit determines that the precharge operation is not necessary, and an instruction to designate that an auto-precharge operation is to be performed after accessing the first address when the determination unit determines that the precharge operation is necessary, and the memory controller comprises an access unit configured to make, when an auto-precharge operation is designated not to be performed after accessing the first address, access without auto-precharge to the first address of the DRAM, and to make, when an auto-precharge operation is designated to be performed after accessing the first address, access with auto-precharge to the first address.

According to still another aspect of the invention, an information processing method for an apparatus comprising a DRAM, a memory controller configured to access the DRAM, and a bus master configured to send, to the memory controller, an access request to the DRAM, comprises the steps of: obtaining a first address on the DRAM to which access is requested, and obtaining a second address on the DRAM to which access is requested following the access to the first address, determining whether a precharge operation is necessary in the DRAM after accessing the first address and before accessing the second address, transmitting the first address to the memory controller, transmitting, to the memory controller, using a signal indicating a type of burst access which is requested of the memory controller by the bus master, an instruction to designate that an auto-precharge operation is not to be performed after accessing the first address when the precharge operation is not determined to be necessary in the determining step, and an instruction to designate that an auto-precharge operation is to be performed after accessing the first address when the precharge operation is determined to be necessary in the determining step, and making, when an auto-precharge operation is designated not to be performed after accessing the first address, access without auto-precharge to the first address of the DRAM, and making, when an auto-precharge operation is designated to be performed after accessing the first address, access with auto-precharge to the first address.

According to yet another aspect of the invention, an information processing method for an apparatus comprising a DRAM, a memory controller configured to access the DRAM, and a bus master configured to send, to the memory controller, an access request to the DRAM, comprises the steps of: obtaining a first address on the DRAM to which access is requested, and to obtain a second address on the DRAM to which access is requested following the access to the first address, determining whether a precharge operation is necessary in the DRAM after accessing the first address and before accessing the second address, transmitting the first address to the memory controller, transmitting, to the memory controller, using a signal indicating whether the bus master has requested exclusive access to a bus which connects the bus master with the memory controller, an instruction to designate that an auto-precharge operation is not to be performed after accessing the first address when the precharge operation is not determined to be necessary in the determining step, and an instruction to designate that an auto-precharge operation is to be performed after accessing the first address when the precharge operation is determined to be necessary in the determining step, and making, when an auto-precharge operation is designated not to be performed after accessing the first address, access without auto-precharge to the first address of the DRAM, and making, when an auto-precharge operation is designated to be performed after accessing the first address, access with auto-precharge to the first address.

According to the invention, a lower-cost method in which a bus master controls a precharge operation by a DRAM can be provided, thereby increasing the access speed to the DRAM.

Further features of the present invention will become apparent from the following description of exemplary embodiments (with reference to the attached drawings).

BRIEF DESCRIPTION OF THE DRAWINGS

FIG. 4 is a table for explaining a burst signal according to the AMBA AHB standard;

DESCRIPTION OF THE EMBODIMENTS

Embodiments of the present invention will be described in detail below with reference to the accompanying drawings. An arrangement to be described in the following embodiments is merely an example, and the present invention is not limited to this.

[First Embodiment]

Figure 1:
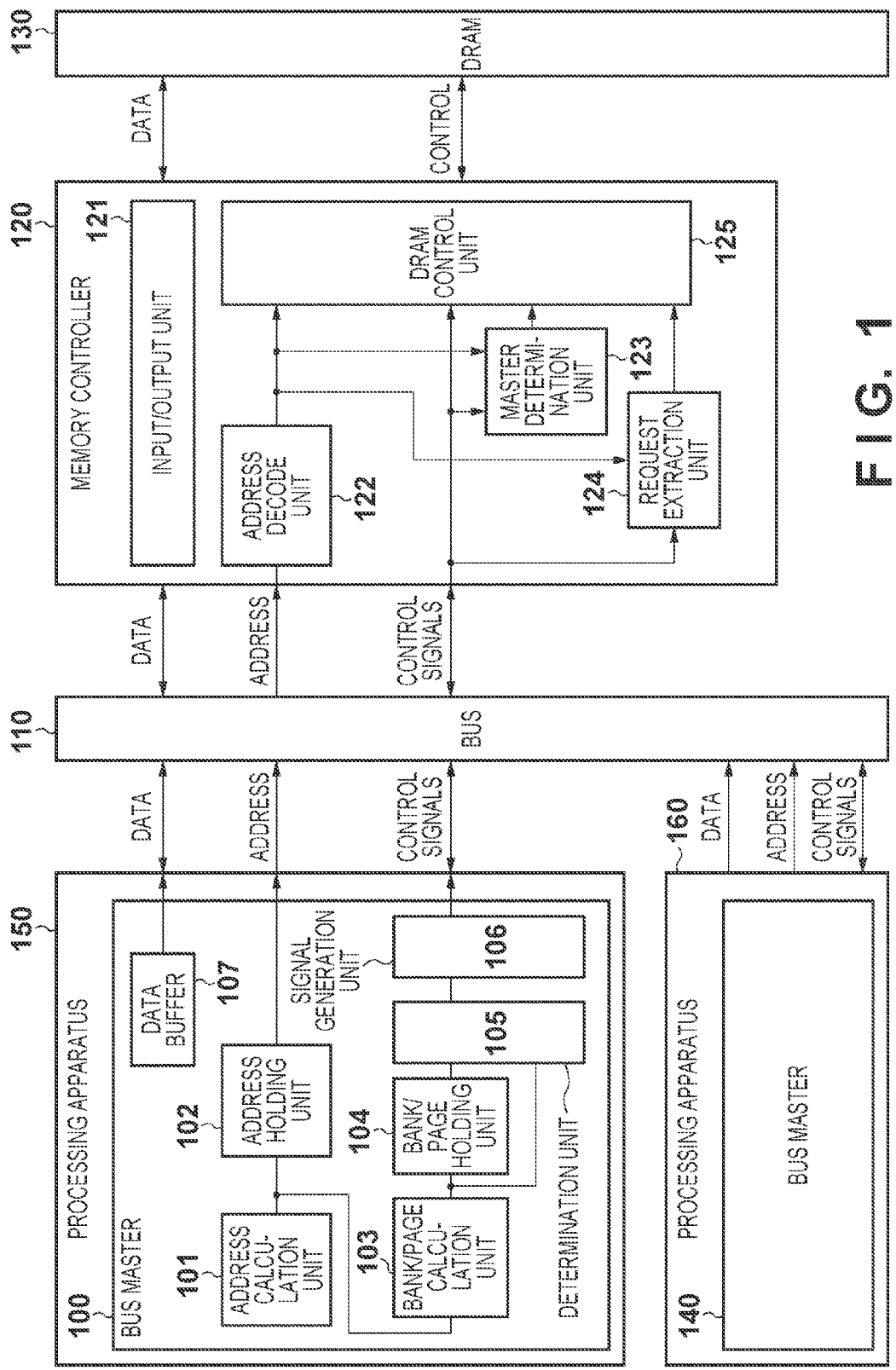
FIG. 1 is a block diagram showing an example of an information processing apparatus according to the first embodiment.

FIG. 1 is a block diagram showing the arrangement of the main part of an information processing apparatus according to the first embodiment. The information processing apparatus according to the first embodiment includes a plurality of processing apparatuses 150 and 160, a bus 110, a memory controller 120, and a DRAM 130. The plurality of processing apparatuses 150 and 160 have bus masters 100 and 140, respectively. Each of the bus masters 100 and 140 may have a memory access pattern different for each processing apparatus. The bus 110 interconnects the processing apparatus 150 or 160 (the bus master 100 or 140) and the memory controller 120. The processing apparatus 150 and bus master 100 will be described below, and the processing apparatus 160 and bus master 140 can operate in the same manner.

The bus master 100 is arranged in the processing apparatus 150, and writes data in a memory. More specifically, to write data in the memory, the bus master 100 outputs control signals, an address, and the data to the bus 110. The control signals may include a request signal for requesting a right to use the memory, a read/write signal indicating an access type, a word length signal indicating a transfer data size, and a burst signal indicating sequential access. Although a detailed description is not provided in the embodiment, the control signals may also include a read data signal and an acknowledge signal indicating that the right to use the memory has been obtained, which are transmitted by the bus 110. Note that the types of control signals to be used are different depending on the specifications of the bus 110. In this embodiment, the bus master 100 writes data in the DRAM 130. The function of the bus master 100, however, is not limited to this, and the bus master 100 can access the DRAM in an arbitrary manner. More specifically, the bus master 100 may write and read data, or may only read data.

To write data in a data buffer 107 into the DRAM 130, an address calculation unit 101 calculates an address at which data is to be written, that is, an address to which access is requested (an obtaining unit). The address calculation unit 101 sequentially calculates addresses according to a memory access pattern for the processing apparatus. That is, the address calculation unit 101 calculates a first address at which data is to be written, and then calculates a second address at which data is to be written thereafter.

An address holding unit 102 holds the addresses calculated by the address calculation unit 101. It is possible to adjust an access timing to the bus 110 by temporarily holding the addresses in the address holding unit 102.

A bank/page calculation unit 103 calculates a bank address and page address at which data is to be written. For example, the bank/page calculation unit 103 calculates a corresponding bank address and page address for the first address calculated by the address calculation unit 101. The bank/page calculation unit 103 also calculates a corresponding bank address and page address for the second address calculated by the address calculation unit 101.

A bank/page holding unit 104 holds the bank addresses and page addressed calculated by the bank/page calculation unit 103. For example, while the bank/page calculation unit 103 calculates the bank address and page address corresponding to the second address, the bank/page holding unit 104 can hold the bank address and page address corresponding to the first address.

A determination unit 105 determines whether it is necessary to perform a precharge operation for the DRAM 130 after accessing the first address and before accessing the second address (a determination unit). More specifically, the determination unit 105 determines whether the page address corresponding to the first address held in the bank/page holding unit 104 coincides with that corresponding to the second address calculated by the bank/page calculation unit 103. For example, the determination unit 105 determines whether the first address and the second address are in the same bank and the same page of the DRAM 130 (a page hit). If the first address and the second address are in the same bank and the same page of the DRAM 130, the determination unit 105 can determine that precharge is not necessary after accessing the first address. On the other hand, if the first address and the second address are not in the same bank or the same page of the DRAM 130 (a page miss), the determination unit 105 determines that precharge is necessary after accessing the first address.

A signal generation unit 106 generates control signals according to the determination of the determination unit 105 (a second transmission unit). The signal generation unit 106 can generate control signals according to the specifications of the bus 110. For example, according to the determination of the determination unit 105, the signal generation unit 106 can output, to the bus 110, a signal to request auto-precharge.

Figure 3:
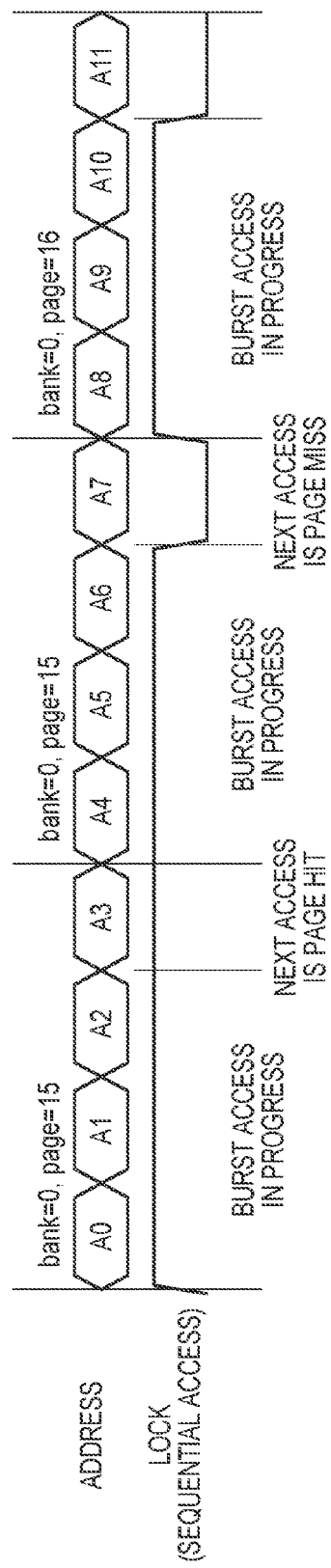
FIG. 3 is a view showing an example of processing according to the first embodiment.

By way of example, as shown in FIG. 3, if the bus 110 has a one-bit LOCK signal for requesting exclusive access to the bus, the signal generation unit 106 can control the LOCK signal. For example, the signal generation unit 106 controls the LOCK signal depending on whether a page hit or page miss is determined at the boundary of an access unit. More specifically, when a page hit is determined for a next access unit, the signal generation unit 106 controls the LOCK signal to be LOCK=High, thereby indicating that sequential access is requested. In this case, an auto-precharge operation is not performed. Furthermore, when a page miss is determined for a next access unit, the signal generation unit 106 controls the LOCK signal to be LOCK=Low, thereby indicating that sequential access is not requested. In this case, an auto-precharge operation is performed.

More specifically, for each memory access request, the signal generation unit 106 controls the LOCK signal depending on whether a next memory access is a page hit or page miss. If auto-precharge is not necessary after memory access, the signal generation unit 106 controls the LOCK signal to be LOCK=High. On the other hand, if auto-precharge is necessary after memory access, the signal generation unit 106 controls the LOCK signal to be LOCK=Low. With reference to FIG. 3, address A4 is accessed after accessing address A3, and addresses A3 and A4 belong to the same page. In requesting access to address A3, therefore, the signal generation unit 106 controls the LOCK signal to be LOCK=High. On the other hand, address A8 is accessed after accessing address A7, and addresses A7 and A8 respectively belong to different pages. In requesting access to address A7, therefore, the signal generation unit 106 controls the LOCK signal to be LOCK=Low.

The data buffer 107 temporarily stores data to be written in the DRAM 130. The data stored in the data buffer 107 is generally a processing result obtained by the processing apparatus. The bus 110 performs arbitration. For example, upon receiving write requests for the DRAM 130 from the plurality of processing apparatuses 150 and 160, the bus 110 determines which one of the write requests from the processing apparatuses is to be accepted. The bus 110 outputs, to the memory controller 120, control signals, an address, and data for the accepted memory access.

Upon receiving an access request from the bus master 100, the memory controller 120 accesses the DRAM 130. The memory controller 120 includes an input/output unit 121, an address decode unit 122, a master determination unit 123, a request extraction unit 124, and a DRAM control unit 125. In response to a request from the bus 110, the input/output unit 121 writes data input from the bus 110 in the DRAM. Furthermore, the input/output unit 121 outputs, to the bus 110, data which has been read out from the DRAM in response to a request from the bus 110.

The address decode unit 122 obtains an address to be accessed from the bus 110, and extracts a row address and a column address from the obtained address. The address decode unit 122 then outputs the extracted row address and column address to the DRAM control unit 125. The address decode unit 122 outputs information indicating the address to be accessed to the master determination unit 123.

Based on the address information obtained from the address decode unit 122 and the control signals obtained from the bus 110, the master determination unit 123 determines a bus master which has requested the memory access. In this embodiment, based on an address area to be accessed, the master determination unit 123 determines a bus master which has requested the memory access. In a system which generally processes a chunk of data such as an image, a memory area to be used by each processing apparatus is permanently or dynamically allocated within the system. It is, therefore, possible to determine a bus master which has requested memory access by examining an address area to be accessed.

In this embodiment, assume that a memory area is allocated to each bus master in advance. If, therefore, access to a memory area allocated to the bus master 100 has been requested, the master determination unit can determine that the bus master 100 has requested the memory access. More specifically, if an address to be accessed is between the top address and bottom address of the memory area allocated to the bus master 100, the master determination unit can determine that the bus master 100 has requested the memory access.

Furthermore, in this embodiment, the master determination unit 123 can make a read/write determination in addition to an address area determination. The master determination unit 123 determines a data transfer direction by making a read/write determination. The master determination unit 123, for example, can make a read/write determination by referring to a read/write signal of the control signals from the bus 110. If the bus 110 is an AHB bus, the master determination unit 123 can make a read/write determination depending on whether an HWRITE signal indicating a transfer direction is High or Low.

If the control signal from the bus 110 indicates a master ID for uniquely designating a bus master, the master determination unit may use the master ID to determine a bus master which has requested the memory access. If the bus 110 is an AHB bus, the control signals includes an HMASTER signal indicating a master which is accessing. The master determination unit 123, therefore, can use the HMASTER signal to determine a bus master which has requested the memory access.

The request extraction unit 124 extracts a signal for requesting auto-precharge from the bus master 100. In this embodiment, the LOCK signal indicates whether auto-precharge has been requested. The request extraction unit extracts the LOCK signal of the control signals from the bus 110. More specifically, if LOCK=High when memory access to a given address has been requested, the request extraction unit 124 determines that auto-precharge has not been requested. If LOCK=Low when memory access to a given address has been requested, the request extraction unit 124 determines that auto-precharge has been requested. Then, the request extraction unit 124 notifies the DRAM control unit 125 of whether auto-precharge has been requested.

In response to a memory access request from the bus master, the DRAM control unit 125 issues an access command to the DRAM 130. The access command issued by the DRAM control unit 125 includes a page open (page activation) command, a page close (precharge) command, a refresh command, a read command, a write command, and a mode set command.

Figure 6:
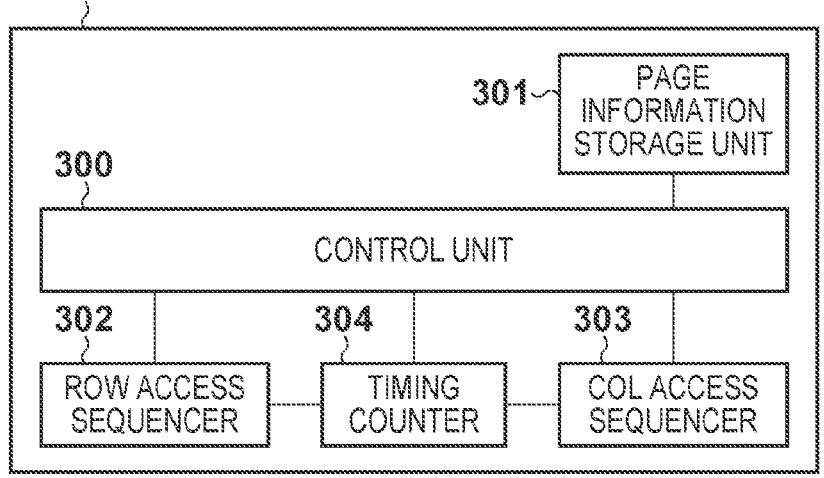
FIG. 6 is a block diagram showing an example of the arrangement of a DRAM control unit 125.

FIG. 6 shows the arrangement of the DRAM control unit 125 (an access unit). The DRAM control unit 125 includes a control unit 300, a page information storage unit 301, a ROW access sequencer 302, a COL access sequencer 303, and a timing counter 304. Based on an address to be accessed, the control unit 300 calculates a bank and page to be accessed. The control unit 300 issues commands to the ROW access sequencer 302 and the COL access sequencer 303 with reference to page information stored in the page information storage unit 301. The page information storage unit 301 stores the open/close state of a page for each bank. When a page is open, the page information storage unit 301 also records its page number.

Upon receiving a page open/close command from the control unit 300, the ROW access sequencer 302 refers to the timing counter 304 to stand by for a command issuable timing. Then, the ROW access sequencer 302 issues a page open/close command to the DRAM 130.

Upon receiving a memory access command from the control unit 300, the COL access sequencer 303 refers to the timing counter 304 to stand by for a command issuable timing. Then, the COL access sequencer 303 issues a read command or write command to the DRAM 130. Note that the COL access sequencer 303 can issue a read command or write command with auto-precharge. Upon receiving the read command or write command with auto-precharge, the DRAM 130 automatically performs a page close operation after a read or write operation ends. If it is known in advance that a page close operation is necessary when a read or write operation according to the read command or write command ends, the COL access sequencer 303 issues a command with auto-precharge. In this case, it is not necessary to issue a page close command. It is, therefore, possible to shorten a time required for memory access.

Figure 2:
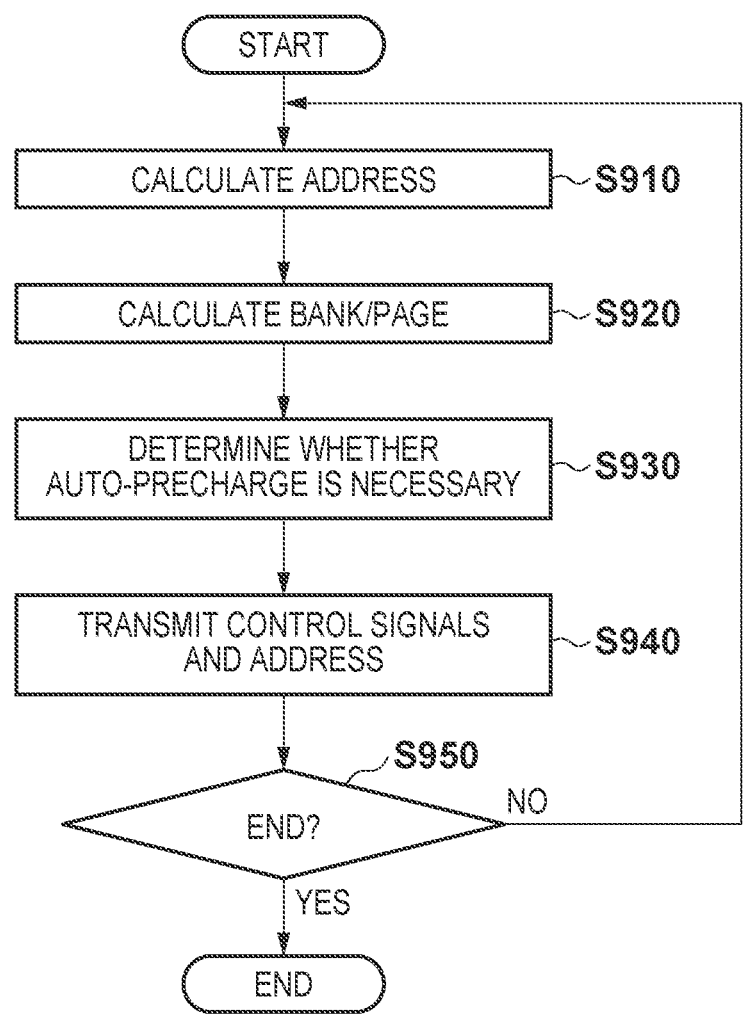
FIG. 2 is a flowchart illustrating an example of processing executed by a bus master 100.

FIG. 2 is a flowchart for explaining, in detail, an example of the memory access request processing executed by the bus master 100. In the flowchart of FIG. 2, processing in steps S910 to S950 is repeated. In the following description, assume that the first address, and the bank address and page address corresponding to the first address are calculated before starting step S910.

In step S910, the address calculation unit 101 calculates an address on a memory (DRAM) to be accessed. As described above, the address calculation unit 101 calculates the second address to be accessed after accessing the first address. The calculated address is stored in the address holding unit 102.

In step S920, the bank/page calculation unit 103 calculates a corresponding bank address and page address for the second address calculated by the address calculation unit 101. The calculated bank address and page address are stored in the bank/page holding unit 104.

In step S930, the determination unit 105 determines whether precharge is necessary. As described above, if the first address and the second address are in the same page on the DRAM 130, the determination unit 105 determines that precharge is not necessary. In step S940, the signal generation unit 106 generates control signals according to the determination result in step S930. More specifically, if precharge is necessary, the LOCK signal is set to Low; otherwise, the LOCK signal is set to High. In this way, an instruction for designating whether to perform a precharge operation is transmitted to the memory controller 120. In step S940, the address holding unit 102 transmits the first address to the memory controller 120 (a first transmission unit). In this way, an access request to the first address is output to the memory controller 120.

In step S950, the address calculation unit 101 determines whether access to a next address has been requested. If access has been requested, the process returns to step S910, a third address to be accessed after accessing the second address is calculated, and an access request to the second address is output to the memory controller 120. If access has not been requested, the process ends.

Figure 7:
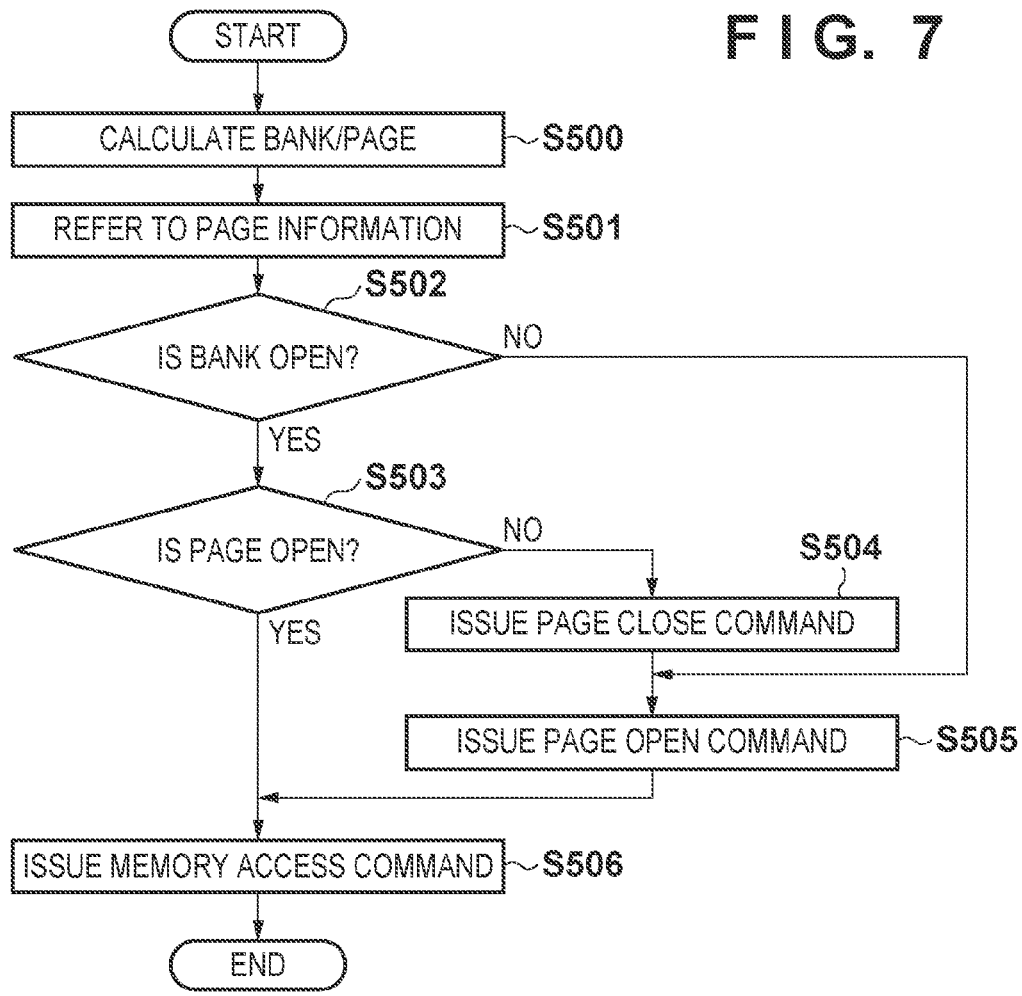
FIG. 7 is a flowchart illustrating an example of processing executed by the DRAM control unit 125.

FIG. 7 is a flowchart for explaining command issuance processing executed by the control unit 300 within the DRAM control unit 125. In step S500, the control unit 300 obtains an address to be accessed, and calculates, based on the address, a bank address and page address. In step S501, with reference to the page information stored in the page information storage unit 301, the control unit 300 checks the state of a bank indicated by the bank address calculated in step S500 and the state of a page indicated by the page address calculated in step S500.

In step S502, the control unit 300 determines whether the bank indicated by the bank address calculated in step S500 is open. If the bank is open, the process advances to step S503; otherwise, the process advances to step S505.

In step S503, the control unit 300 determines whether the page indicated by the page address calculated in step S500 is open. The fact that the page indicated by the page address calculated in step S500 is open means a page hit. The fact that the page indicated by the page address calculated in step S500 is not open means a page miss. If the page is open, the process advances to step S506; otherwise, the process advances to step S504.

In step S504, the control unit 300 issues, to the ROW access sequencer 302, a command to close a page which is currently open. In step S505, the control unit 300 issues, to the ROW access sequencer 302, a command to open the page indicated by the page address calculated in step S500. In step S506, the control unit 300 issues, to the COL access sequencer 303, a memory access command to the address obtained in step S500.

Figure 8:
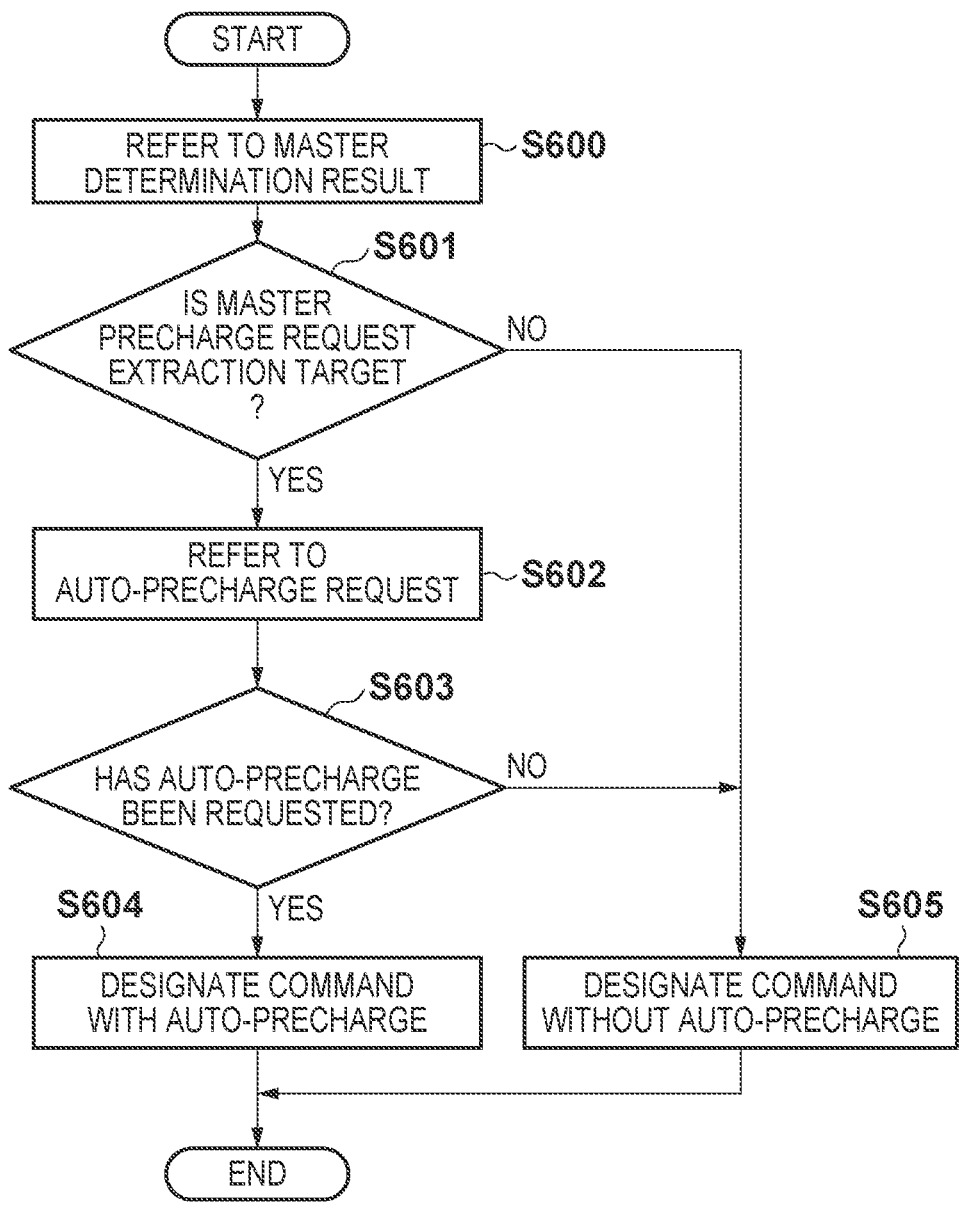
FIG. 8 is a flowchart illustrating an example of processing executed by the DRAM control unit 125.

FIG. 8 is a flowchart illustrating, in detail, the memory access command issuance processing in step S506. In step S600, the control unit 300 obtains, from the master determination unit 123, information indicating a bus master which has requested memory access. In step S601, the control unit 300 determines whether the bus master which has requested the memory access can issue a precharge request. The control unit 300 can make the determination with reference to a memory (not shown). The memory (not shown) stores, for each bus master, information indicating whether it can issue an auto-precharge request. If the bus master can issue a precharge request, the process advances to step S602; otherwise, the process advances to step S605.

In step S602, the control unit 300 receives, from the request extraction unit 124, a notification indicating whether auto-precharge has been requested. In step S603, the control unit 300 refers to the notification from the request extraction unit 124 to determine whether auto-precharge has been requested.

If auto-precharge has been requested, the process advances to step S604; otherwise, the process advances to step S605.

In step S604, the control unit 300 issues, to the COL access sequencer 303, a memory access command with auto-precharge to the address designated by the bus 110. On the other hand, in step S605, the control unit 300 issues, to the COL access sequencer 303, a memory access command without auto-precharge to the address designated by the bus 110.

As described above, in this embodiment, the memory controller performs a page close operation in response to an auto-precharge request from the bus master. This can decrease the number of cycles necessary for precharge of the DRAM. Note that a signal (LOCK signal) indicating sequential access by the bus master is used to send an auto-precharge request from the bus master. Therefore, it is not necessary to change a bus interface or increase the number of wiring lines. The above-described method can increase the memory access speed especially when the memory is randomly accessed. For example, image transformation processing such as keystone correction may be executed in an image projection apparatus. In such image transformation processing, a memory is randomly accessed. It is, therefore, advantageous to apply the method as described in this embodiment to an image processing apparatus such as an image projection apparatus for executing an image transformation processing.

[Second Embodiment]

In the second embodiment, a bus conforming to the AMBA AHB standard as an on-chip bus generally used is used as a bus 110. As shown in FIG. 4, the AHB protocol defines a burst operation for executing sequential access to a memory. More specifically, the AHB protocol supports both an incremental burst and a wrapped burst.

Incremental bursts access sequential locations. More specifically, successive memory addresses are sequentially accessed. Unlike wrapped bursts to be described next, incremental bursts do not wrap at address boundaries. On the other hand, wrapped bursts also sequentially access successive memory addresses but wrap at address boundaries.

Address boundaries will now be described. In a burst operation, memory addresses on a DRAM 130 are grouped in address spaces using address boundaries, and each address space corresponds to a data amount which is accessed by one burst. Assume, for example, that a memory access is made every four bytes. In this case, if a four-beat burst access is made, 16-byte data is accessed by one burst. In this case, memory addresses are grouped every 16 bytes.

A four-beat wrapped burst of four-byte accesses wraps at 16-byte address boundaries in the DRAM. More specifically, an access starts at address 0x34, four bytes from the address 0x34, those from an address 0x38, those from an address 0x3C, and those from an address 0x30 are sequentially accessed.

Note that if the burst accesses start at the top address of each address space, the address do not wrap. If a four-beat wrapped burst of four-byte accesses starts at the address 0x30, the accesses are made as follows. That is, four bytes from the address 0x30, those from the address 0x34, those from the address 0x38, and those from the address 0x3C are sequentially accessed.

In the AHB protocol, an HBURST signal (to be referred to as a burst signal hereinafter) is used to designate an incremental burst or wrapped burst. In this embodiment, the bus 110 uses the burst signal indicating the type of burst access to send an auto-precharge request. More specifically, a signal generation unit 106 designates the top address of an address space as a memory address to be accessed, and notifies that the bus 110 has requested auto-precharge by sending the burst signal indicating a wrapped burst. On the other hand, if the bus 110 has not requested auto-precharge, the signal generation unit 106 sends the burst signal indicating an incremental burst when the top address of an address space is designated as a memory address to be accessed.

As a more practical example, a case in which the address 0x30 is designated as an access start address in the four-beat burst of four-byte accesses. If auto-precharge is requested, the signal generation unit 106 uses the burst signal to designate a wrapped burst. If auto-precharge is not requested, the signal generation unit 106 uses the burst signal to designate an incremental burst.

Figure 5:
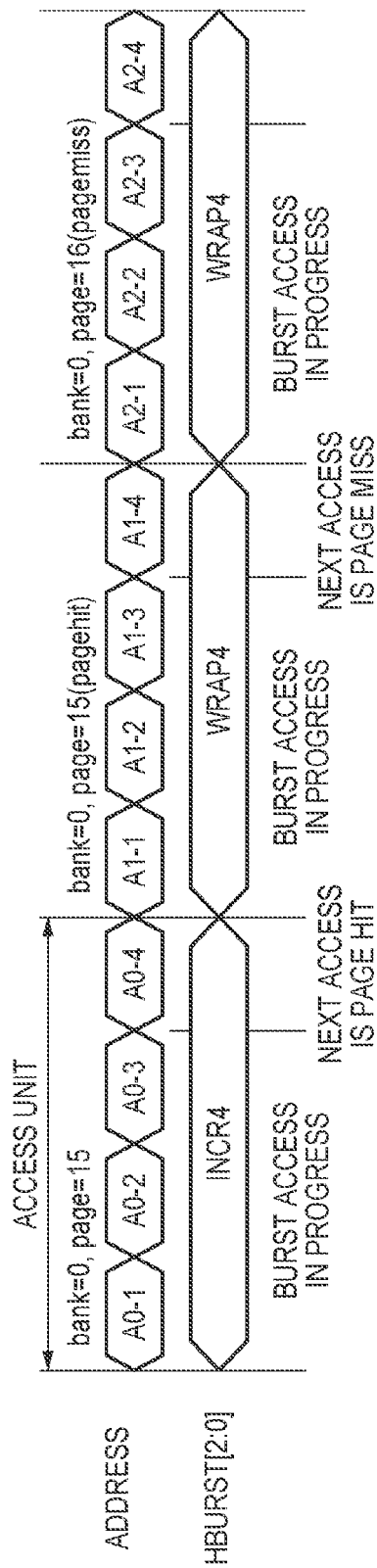
FIG. 5 is a view showing an example of processing according to the second embodiment.

It is possible to implement the processing according to this embodiment by changing the operation of steps S910 to S950 and S602 in the first embodiment. Processing in steps S910 to S950 in this embodiment will be described with reference to FIG. 5. Assume that after one burst access to addresses A0-1 to A0-4, a next burst access to addresses A1-1 to A1-4 is performed, as shown in FIG. 5. After the one burst access to addresses A1-1 to A1-4, a next burst access to addresses A2-1 to A2-4 is performed. Assume also that these burst accesses are an incremental burst or wrapped burst.

As in the first embodiment, the processing in steps S910 to S950 is repeated. Assume that the group of addresses A0-1 to A0-4, and a bank address and page address for the group of addresses A0-1 to A0-4 are calculated before the following processing starts. In step S910, an address calculation unit 101 calculates a group of addresses to be accessed by one burst access. According to the example of FIG. 5, the address calculation unit 101 calculates the group of addresses A1-1 to A1-4. According to the method of this embodiment, if the first address of each address group is the top address of an address space to be accessed by one wrapped burst, it is possible to designate whether to perform auto-precharge. Even if, therefore, a burst transfer operation starting at an address other than the top address of the address space is to be executed, it may be better to designate a burst transfer operation starting at the top address of the address space. When the order of addresses to be designated is to be changed, a bus master can further include a data sort unit (not shown). The data sort unit can sort data so that the order of data to be written in the memory or the order of data read out from the memory corresponds to the order of addresses before the change operation.

In step S920, a bank/page calculation unit 103 calculates a bank address and page address for the group of addresses A1-1 to A1-4. Since one burst access is generally executed for one page, the bank/page calculation unit 103 may calculate a bank address and page address only for the first address of each address group.

In step S930, a determination unit 105 first determines whether the first address (A0-1) of the group of addresses A0-1 to A0-4 is the top address of an address space to be accessed by one wrapped burst. If the first address is not the top address of the address space, the determination unit 105 does not determine whether auto-precharge is necessary. In this case, according to the group of addresses A0-1 to A0-4, the signal generation unit 106 outputs a control signal indicating an incremental burst or wrapped burst.

If the first address of each address group is the top address of an address space to be accessed by one wrapped burst, the determination unit 105 executes the following processing. That is, the determination unit 105 compares a page address corresponding to memory addresses (A0-1 to A0-4) to undergo one burst access with that corresponding to memory addresses (A1-1 to A1-4) to undergo a burst access thereafter. The determination unit 105 may compare the memory addresses (A0-1 and A1-1) to be accessed first. If the page addresses coincide with each other and the bank addresses coincide with each other (the same page is to be accessed), the determination unit 105 determines that auto-precharge is not necessary. If the page addresses or bank addresses do not coincide with each other, the determination unit 105 determines that auto-precharge is necessary.

Processing in step S940 will be described next. If it is determined that auto-precharge is not necessary, the signal generation unit 106 outputs, as a burst signal, a signal (INCR4 in FIG. 5) indicating an incremental burst. If it is determined that auto-precharge is necessary, the signal generation unit 106 outputs, as a burst signal, a signal indicating a wrapped burst.

In step S940, an address holding unit 102 sequentially outputs the group of addresses A0-1 to A0-4. In this way, a bus master 100 outputs, to a memory controller 120, a memory access request to the group of addresses A0-1 to A0-4.

In step S950, the address calculation unit 101 determines whether access to a next address group has been requested. If access has been requested, the process returns to step S910 to calculates a group of addresses (A2-1 to A2-4) to be accessed after accessing the next group of addresses (A1-1 to A1-4). An access request to the group of addresses A1-1 to A1-4 is output to the memory controller 120. In FIG. 5, the page address of the group of addresses A1-1 to A1-4 does not coincide with that of the group of addresses A2-1 to A2-4. To output an access request to the group of addresses A1-1 to A1-4, therefore, the signal generation unit 106 outputs, as a burst signal, a signal (WRAP4) indicating a wrapped burst. On the other hand, if it is determined in step S950 that access to a next group of addresses has not been requested, the process ends.

Furthermore, in step S602, a request extraction unit 124 operates as follows. That is, the request extraction unit 124 refers to address information output from an address decode unit 122. If the first address of an address group to be accessed by one burst access is the top address of an address space to be accessed by one wrapped burst, the request extraction unit refers to a burst signal from the bus 110. If the burst signal designates an incremental burst, the request extraction unit 124 determines that auto-precharge has not been requested. On the other hand, if the burst signal designates a wrapped burst, the request extraction unit 124 determines that auto-precharge has been requested.

If the first address of an address group to be accessed by one burst access is not the top address of an address space to be accessed by one wrapped burst, the request extraction unit determines that it has not been designated whether to perform an auto-precharge operation. In such case, the request extraction unit 124 may instruct a DRAM control unit 125 to perform an auto-precharge operation. Alternatively, the request extraction unit 124 may instruct the DRAM control unit 125 not to perform an auto-precharge operation. According to a known method, the request extraction unit 124 may determine whether to perform an auto-precharge operation. For example, there has been conventionally known a method of performing, according to the history of accessed addresses, a simple prediction whether to perform an auto-precharge operation. According to a prediction unit (not shown) for implementing such method, the request extraction unit 124 may determine whether to perform an auto-precharge operation.

The request extraction unit 124 notifies the DRAM control unit 125 of the determination result of whether auto-precharge has been requested. If a single transfer operation is designated as a burst operation (for example, an HTRANS signal designates NONSEQ), the request extraction unit 124 may determine that auto-precharge has not been requested. In this embodiment, an incremental burst is designated when auto-precharge is not requested, and a wrapped burst is designated when auto-precharge is requested. When auto-precharge is requested, it is possible to arbitrarily set whether an incremental burst or wrapped burst is assigned. That is, when auto-precharge is not requested, one of an incremental burst and wrapped burst may be selected. Then, when auto-precharge is requested, the other one of the incremental burst and wrapped burst may be selected.

In the second embodiment, the bus master 100 can request auto-precharge of the memory controller without changing the existing standard. It is, therefore, possible to increase the memory access speed without changing an interface such as installation of additional wiring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129540, filed Jun. 9, 2011, which is hereby incorporated by reference herein in its entirety.

What is claimed is:

1. A memory controlling system comprising:
   a plurality of information processing apparatuses connected to a memory controller;
   a memory; and
   the memory controller, which accesses the memory,
   wherein at least one of the plurality of information processing apparatuses comprises:
   a specifying unit configured to specify a first address and a second address on the memory to be sequentially accessed by the information processing apparatus via the memory controller;
   a determining unit configured to determine whether the first and second addresses are corresponding to the same page on the memory; and
   an outputting unit configured to output, to the memory controller:
   address information corresponding to the first and second addresses with a control signal indicating that an exclusive access to a bus which connects the plurality of information processing apparatuses and the memory controller is not requested, in a case where the determining unit determines that the first and second addresses are not corresponding to the same page on the memory, and
   address information corresponding to the first and second addresses with a control signal indicating that the exclusive access to the bus is requested, in a case where the determining unit determines that the first and second addresses are corresponding to the same page on the memory, and
   the memory controller comprising:
   a receiving unit configured to receive the address information corresponding to the first and second addresses and the control signal output by the information processing apparatus; and
   a memory controlling unit configured to output to the memory:
   a first control command such that a page on the memory is closed according to completion of access to the first address in a case where the received control signal indicates that the exclusive access to the bus is not requested, and a second control command such that the page on the memory is not closed according to the completion of access to the first address in a case where the received control signal indicates that the exclusive access to the bus is requested.

2. The memory controlling system according to claim 1, wherein the memory is a DRAM.

3. The memory controlling system according to claim 1, wherein the at least one of the plurality of information processing apparatuses comprises a second determining unit configured to, in a case where the information processing apparatus accesses the memory based on a group of addresses, determine whether the top address of the group of addresses is the top address of an address space accessed based on the group of addresses, wherein the outputting unit does not output the control signal related to closing of the page in a case where the second determining unit determines that the top address of the group of addresses is not the top address of the address space accessed based on the group of addresses.

4. The memory controlling system according to claim 3, wherein the specifying unit specifies a first group of addresses and a second group of addresses based on a memory access pattern of the information apparatus, the second group of addresses on the memory are accessed after the accessing the first group of addresses on the memory, and the determining unit determines whether the first group of addresses and the second group of addresses are corresponding to the same page in a case where the second determining unit determines that the top address of the first group of addresses is the top address of an address space accessed based on the first group of addresses, and wherein the outputting unit outputs to the memory controller the control signal indicating that the exclusive access to the bus is not requested in a case where the determining unit determines that the first and second groups of addresses are not corresponding to the same page, and outputs to the memory controller the control signal indicating that the exclusive access to the bus is requested in a case where the determining unit determines that the first and second groups of addresses are corresponding to the same page.

5. The memory controlling system according to claim 1, wherein the memory controller comprises a third determining unit configured to determine, based on identification information of each of the plurality of information processing apparatuses, whether the information processing apparatus can request closing of the page using the control signal, and wherein the memory controller outputs to the memory:

the first control command such that the page on the memory is closed according to the completion of the access to the first address in a case where it is determined that the information processing apparatus can request closing of the page and the control signal from the information processing apparatus indicates that the exclusive access to the bus is not requested, the second control command such that the page on the memory is not closed according to the completion of the access to the first address in a case where it is determined that the information processing apparatus can request closing of the page and the control signal from the information processing apparatus indicates that the exclusive access to the bus is requested, and the second control command such that the page on the memory is not closed according to the completion of the access to the first address in a case where it is determined that the information processing apparatus cannot request closing of the page.

6. A controlling method of a memory controlling system in which a plurality of information processing apparatuses are connected to a memory controller which accesses a memory, the method comprising:

specifying, by at least one of the information processing apparatuses a first address and a second address on the memory to be sequentially accessed by the information processing apparatus via the memory controller;

determining, by the at least one of the information processing apparatuses, whether the first and second addresses are corresponding to the same page on the memory; and outputting, by the at least one of the information processing apparatuses, to the memory controller:

address information corresponding to the first and second addresses with a control signal indicating that an exclusive access to a bus which connects the plurality of information processing apparatuses and the memory controller is not requested in a case where the determining step determines that the first and second addresses are not corresponding to the same page on the memory, and address information corresponding to the first and second addresses with a control signal indicating that the exclusive access to the bus is requested in a case where the determining step determines that the first and second addresses are corresponding to the same page on the memory;

receiving, by the memory controller, the address information corresponding to the first and second addresses and the control signal output by the information processing apparatus; and outputting, by the memory controller, to the memory:

a first control command such that a page on the memory is closed according to completion of access to the first address in a case where the received control signal indicates that the exclusive access to the bus is not requested, and a second control command such that the page on the memory is not closed according to the completion of access to the first address in a case where the received control signal indicates that the exclusive access to the bus is requested.

7. The method according to claim 6, wherein the memory is a DRAM.

8. The method according to claim 6, further comprising determining, by the at least one of the plurality of information processing apparatuses, in a case where the information processing apparatus accesses the memory based on a group of addresses, whether the top address of the group of addresses is the top address of an address space accessed based on the group of addresses, wherein the outputting step does not output the control signal related to closing of the page in a case where the second determining step determines that the top address of the group of addresses is not the top address of the address space accessed based on the group of addresses.

9. The method according to claim 8, wherein the specifying step specifies a first group of addresses and a second group of addresses based on a memory access pattern of the information processing apparatus, the second group of addresses on the memory are accessed after the accessing the first group of address on the memory, the determining step determines whether the first group of addresses and the second group of addresses are corresponding to the same page in a case where the second determining step determines that the top address of the first group of addresses is the top address of an address space accessed based on the first group of addresses, and wherein the outputting step outputs to the memory controller the control signal indicating that the exclusive access to the bus is not requested in a case where the determining step determines that the first and second groups of addresses are not corresponding to the same page, and outputs to the memory controller the control signal indicating that the exclusive access to the bus is requested in a case where the determining step determines that the first and second group of addresses are corresponding to the same page.

10. The method according to claim 6, further comprising determining, by the memory controller, based on identification information of each of the plurality of information processing apparatuses, whether the information processing apparatus can request closing of the page using the control signal, and the memory controller outputting to the memory;

the first control command such that the page on the memory is closed according to the completion of the access to the first address in a case where it is determined that the information processing apparatus can request closing of the page and the control signal from the information processing apparatus indicates that the exclusive access to the bus is not requested, the second control command such that the page on the memory is not closed according to the completion of the access to the first address in a case where it is determined that the information processing apparatus can request closing of the page and the control signal from the information processing apparatus indicates that the exclusive access to the bus is requested, and the second control command such that the page on the memory is not closed according to the completion of the access to the first address in a case where it is determined that the information processing apparatus cannot request closing of the page.

11. The memory controlling system according to claim 1, wherein the specifying unit calculates the first address and the second address on the memory based on a memory access pattern specific to the information processing apparatus.

* * * * *